United States Patent [19]

Kisami et al.

[11] Patent Number: 5,520,442
[45] Date of Patent: May 28, 1996

[54] PROTECTIVE DEVICE FOR A DRIVER'S CAB FRONT OF LARGE-SIZE DUMP TRUCK

[75] Inventors: Nobuyuki Kisami; Kyoji Uranaka; Satoshi Tanaka, all of Kanagawa-ken, Japan

[73] Assignee: Kabushiki Kaisha Komatsu Seisakusho, Japan

[21] Appl. No.: 211,640

[22] PCT Filed: Aug. 17, 1993

[86] PCT No.: PCT/JP93/01152

§ 371 Date: Apr. 11, 1994

§ 102(e) Date: Apr. 11, 1994

[87] PCT Pub. No.: WO94/04395

PCT Pub. Date: Mar. 3, 1994

[30] Foreign Application Priority Data

Aug. 18, 1992 [JP] Japan ............... 4-063122 U

[51] Int. Cl.⁶ .................................................. B60P 1/28
[52] U.S. Cl. ................ 298/17 R; 296/184; 296/188; 296/190; 414/914
[58] Field of Search .................... 298/1 R, 17 R, 298/1 C; 296/184, 188, 190; 414/914

[56] References Cited

U.S. PATENT DOCUMENTS

| | | | |
|---|---|---|---|
| 3,709,521 | 1/1973 | Davis | 296/190 |
| 3,847,492 | 11/1974 | Kennicutt et al. | 296/190 |
| 3,940,177 | 2/1976 | Miers et al. | 296/190 |
| 3,977,489 | 8/1976 | Cole et al. | 296/190 |
| 4,071,277 | 1/1978 | Stedman | 296/184 |
| 4,143,903 | 3/1979 | Yoshida et al. | 296/190 |
| 4,358,152 | 11/1982 | Mayer et al. | 296/190 |
| 4,531,781 | 7/1985 | Hunt et al. | 296/184 |
| 4,705,449 | 11/1987 | Christianson et al. | 414/914 |

FOREIGN PATENT DOCUMENTS

| | | | |
|---|---|---|---|
| 1475777 | 2/1967 | France | 414/914 |
| 62-27857 | 2/1987 | Japan . | |

*Primary Examiner*—David A. Bucci
*Assistant Examiner*—Gregory A. Morse
*Attorney, Agent, or Firm*—Ronald P. Kananen

[57] ABSTRACT

A protective device for a front of a large-size dump truck, in which a driver's cab (13) is secured on a front side of a truck body (10) and a vessel (15) is, liftably from its front side, secured on a rear side of the truck body, is characterized in that a front protective guard (20) protruding forward from a position of the driver's cab is attached on a front end portion of the vessel. A protective device for a front of a large-size dump truck, in which a driver's cab (216) is secured on a front side of a truck body (210) and a vessel (221) is, liftably from its front side, secured on a rear side of the truck body and a protective guard (217) for falling to protect an upper portion and a rear portion of the driver's cab is secured on an upper portion of the truck body between the driver's cab and the vessel, is characterized in that an front protective guard (218) is arranged to be extended between a front end portion of the protective guard for falling and a front end portion of the truck body in front of the driver's cab.

6 Claims, 8 Drawing Sheets

PROTECTIVE DEVICE FOR A DRIVER'S CAB FRONT OF LARGE-SIZE DUMP TRUCK

TECHNICAL FIELD

The present invention relates to a protective device which protects the front of an operation room of a large-size dump truck utilized for construction work and ore transportation.

BACKGROUND ART

A large-size dump truck utilized for construction work and ore transportation, as shown in FIG. 1, comprises a truck body 1 having a base to which are attached front wheels 2 and rear wheels 3. A driver's cab 4 is attached to the front of the truck body. A vessel 5 that is able to lift from its front side. The rear of the vessel protrudes largely backward from the position of the rear wheels 3.

Such a large-size dump truck often runs on a rough road, and therefore, there is a possibility that the dump truck will fall over. In order to protect an operator when the dump truck falls over, as shown in FIG. 1, a protective guard 6 for falling is secured on the truck body 1 between the operation room 4 and vessel 5 for protecting the rear part and upper part of the driver's cab 4. Further, as shown in FIG. 2, there is provided a protective guard 7 for providing protection against falling toward the entire of the driver's cab 4, where the protective guard 7 is secured on the body 1 in one piece with the driver's cab 4.

As explained above, since the rear of the vessel 5 largely protrudes from the position of the rear wheels 3, when the large-size dump truck having the protective guard 6 shown in FIG. 1 runs backward, the rear of the vessel 5 may collide with the driver's cab 4 of another large-size dump truck which follows, as shown in FIG. 3, sometimes causing serious damage.

In the case of the large-size dump truck having the protective guard 7 for falling as shown in FIG. 2, the protective guard 7 prevents the driver's cab 4 from being damaged when the rear of the vessel 5 collides with another one. However, since the protective guard 7 for falling is firmly fastened on A- and B-portions of the truck body 1 using bolts, it is almost true that the driver's cab 4 is directly fixed on the truck body 1, thereby increasing vibration and noise reaching the driver's cab 4. In contrast, the large-size dump truck in FIG. 1 can reduce vibration and noise reaching the driver's cab 4, because it is possible to fix the driver's cab 4 on a C-portion of the truck body 1 via a rubber member.

On one hand, as illustrated in FIG. 4, a collision-protective stopper 9 can be attached to a bumper 8 of the truck body 1, which is able to avoid a collision between the rear of the vessel 5 and the driver's cab 4 of the large-size dump truck which follows, because the collision-protective stopper 9 can be in touch with the rear wheels 3 of a preceding large-size dump truck before the collision. However, such a design increases the overall length of a large-size dump truck, which will become an obstacle to traveling in a narrow area.

Therefore, an object of the present invention is to provide a protective device for the driver's cab front of a large-size dump truck constructed such that, when the rear of the vessel of a preceding dump truck collides with the front of the operation room of a following dump truck, the driver's cab of the following dump truck can surely and safely be avoided from being damaged. The driver's cab can be fixed via a buffer member on the truck body in the same way as the conventional one, so as to reduce vibration and noise, and the large-size dump truck can maintain a small turn radius by excluding a long overall length of the truck body.

BRIEF SUMMARY OF THE INVENTION

In order to achieve the above-mentioned and other objects, as one aspect of the present invention, it is to be provided that a protective device for a front of a driver's cab of a large-size dump truck in which a driver's cab is secured on a front side of a truck body and a vessel is, liftably from its front side, secured on a rear side of the truck body, being characterized in that an operation-room front protective guard protruding forward from a position of the driver's cab is attached on a front end portion of the vessel.

The aforementioned construction enables the driver's cab front protective guard to prevent the rear portion of the dump body or vessel of a preceding large-size dump truck from colliding with the front of the operation room of another following large-size dump truck, resulting in no-damage to the driver's cab and being safe. Further, attaching the driver's cab front protective guard to the front end portion of the vessel permits an arrangement of the driver's cab through a buffer member on the truck body in the same way as the conventional one, so that vibration and noise transmitted to the driver's cab can be reduced. It is possible to bring the driver's cab front protective guard into an inner position relative to that of the front of the truck body, thus maintaining a small turn radius because of a controlled overall length of the truck body.

Preferably, the front protective guard is attached to a protector extended over the driver's cab from a front panel of the vessel.

In that case, it is preferred that the front protective guard for the driver's cab comprises a pair of right and left horizontal attaching frames having bases attached to the protector and tips which extend forward from outer sides of the driver's cab, a pair of right and left vertical protective frames having middle portions are each attached to the tips of the pair of horizontal attaching frames and whole bodies extending vertically, a plurality of lateral protective frames bridged between the pair of right and left vertical protective frames in front of the driver's cab, and upper and lower stays obliquely bridged between the vertical protective frames and horizontal attaching frames.

Also preferably, the front protective guard is attached both to a front panel of the vessel and to a protector extended over the driver's cab from the front panel.

Such construction permits the front protective guard to be more securely attached to the vessel.

In such a case, it is preferred that the front protective guard for a driver's cab comprises a horizontal protective frame formed into a U-shape viewed from a vertical position base having a base which is attached to the front plate and an entire body which surrounds the driver's cab, a pair of right and left vertical protective frames having lower portions attached to a front portion of the horizontal protective frame and upper portions attached to the protector in front of the operation room, and a lateral protective frame bridged between the pair of right and left vertical protective frames.

Furthermore, as another aspect of the present invention, there is provided a protective device for front of a driver's cab of a large-size dump truck in which a driver's cab is secured on a front side of a truck body and a vessel is, liftably from its front side, secured on a rear side of the truck body and a protective guard for falling to protect an upper portion and a rear portion of the driver's cab is secured on an upper portion of the truck body between the driver's cab and the vessel, the protective device being characterized in that an front protective guard is arranged to be extended between a front end portion of the protective guard for falling and a front end portion of the truck body in front of the operation room.

This construction offers the same advantages as those of the aforementioned one aspect.

In a case of another aspect, it is preferred that the front protective guard for a driver's cab comprises a pair of right and left vertical protective frames having upper portions are attached to the front end portion of the protective guard for falling and lower portions connected to the front end portion of the truck body and a lateral protective frame bridged between the pair of right and left vertical protective frames.

Further, in that case, it is preferred that an elastic connection mechanism intervenes between each lower end of the pair of right and left vertical protective frames and the front end portion of the truck body.

Such construction makes the vertical protective frames possible to displace against the truck body when the protective guard for falling is distorted due to a transverse load, thereby avoiding undesirable influence on function of the protective guard for falling by which shock energy yielded in falling is absorbed.

Further, in such a case, it is preferred that the elastic connection mechanism comprises a bracket attached to the front end portion of the truck body, an elastic tubular member arranged to each lower end of the vertical protective frames, and a pin inserted through the bracket and the elastic tubular member.

This arrangement provides easier removal of the vertical protective frames from the truck body by pulling out the pin of the connection mechanism.

Preferably, the truck body comprises a main frame, a front lateral frame and front vertical frame attached to a front end of the main frame, and an arch-shaped frame attached to a middle portion of the main frame, wherein a base end portion of the protective guard for falling is attached to the arch-shaped frame and a lower end portion of the front protective guard is connected with the front vertical frame.

Also preferably, front and rear end portions of the operation room are each secured through an elastic member on the truck body.

Such arrangement reduces vibration and noise transmitted from the truck body to the operation room, thus leading to a comfortable ride.

BRIEF DESCRIPTION OF THE DRAWINGS

The present invention will be well understood according to the following detailed explanation and the accompanying drawings representing embodiments of the present invention. The embodiments represented in the accompanying drawings are not intended to limit the present invention but merely make the explanation and understanding easier.

In the drawings.

DETAILED DESCRIPTION OF THE PREFERRED EMBODIMENTS

A protective device of a front portion of an a driver's cab of a large-size dump truck according to a first embodiment of the present invention will now be described hereinafter with reference to FIGS. 5 to 10.

Figure 1:
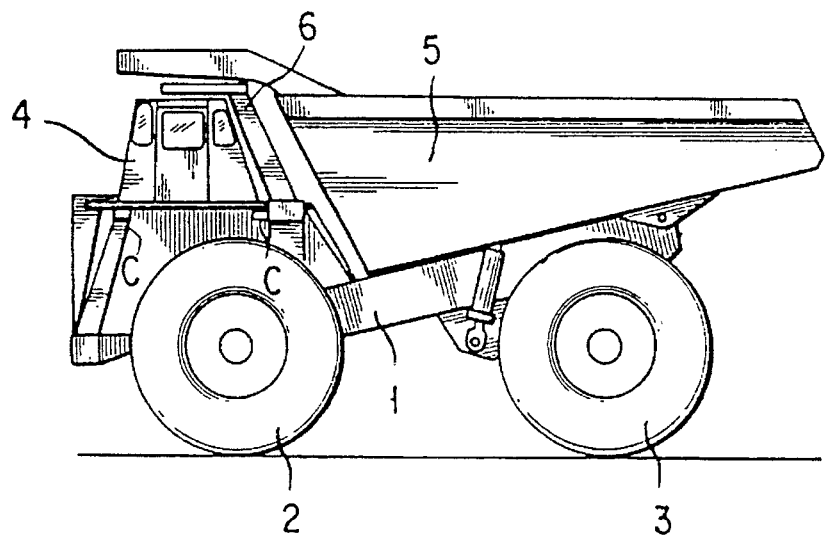
FIG. 1 is a side view of one example according to a conventional large-size dump truck.
Figure 2:
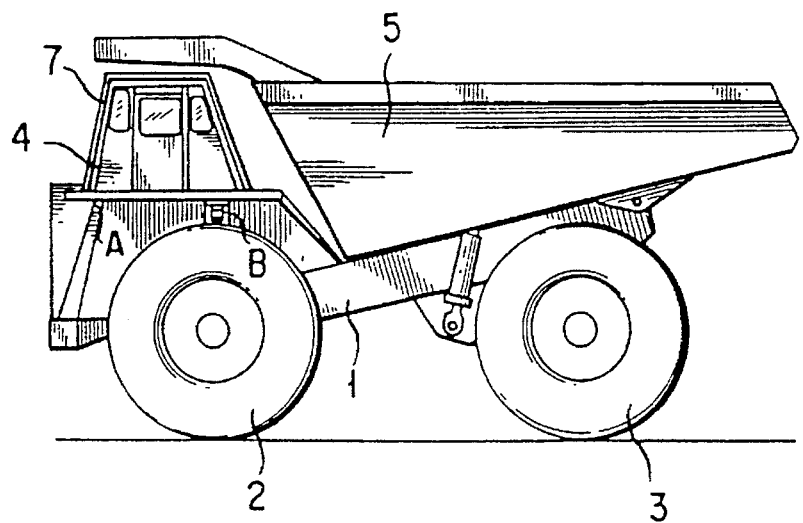
FIG. 2 is a side view of another example according to a conventional large-size dump truck.
Figure 3:
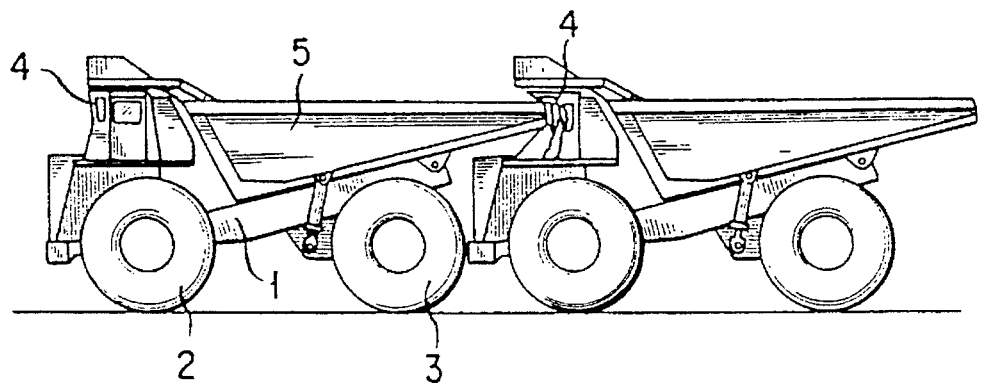
FIG. 3 is a side view useful for explaining a collision between two large-size dump trucks shown in FIG. 1.
Figure 4:
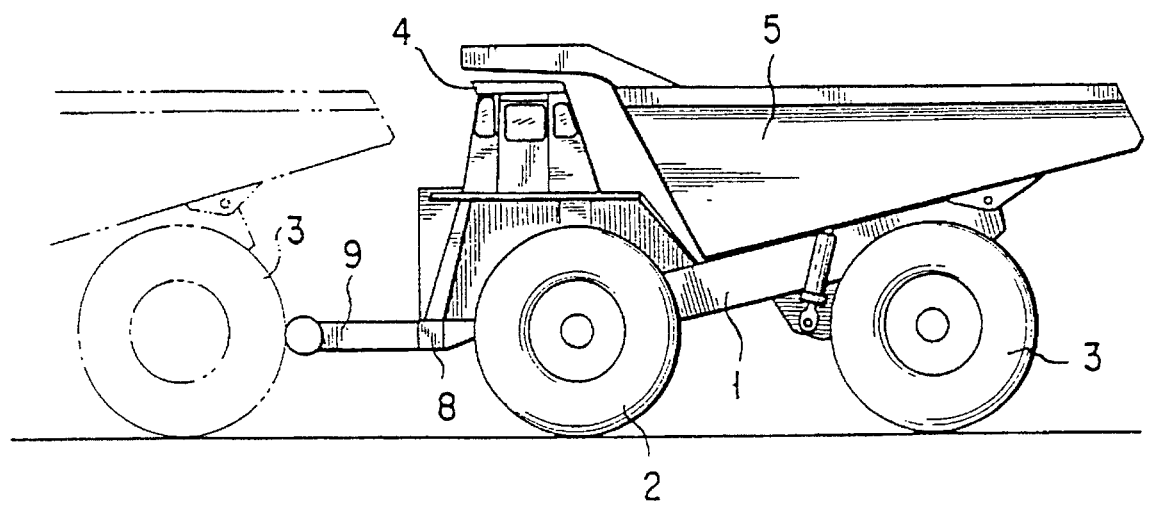
FIG. 4 is a side view of a conventional large-size dump truck having a collision-protective stopper.
Figure 5:
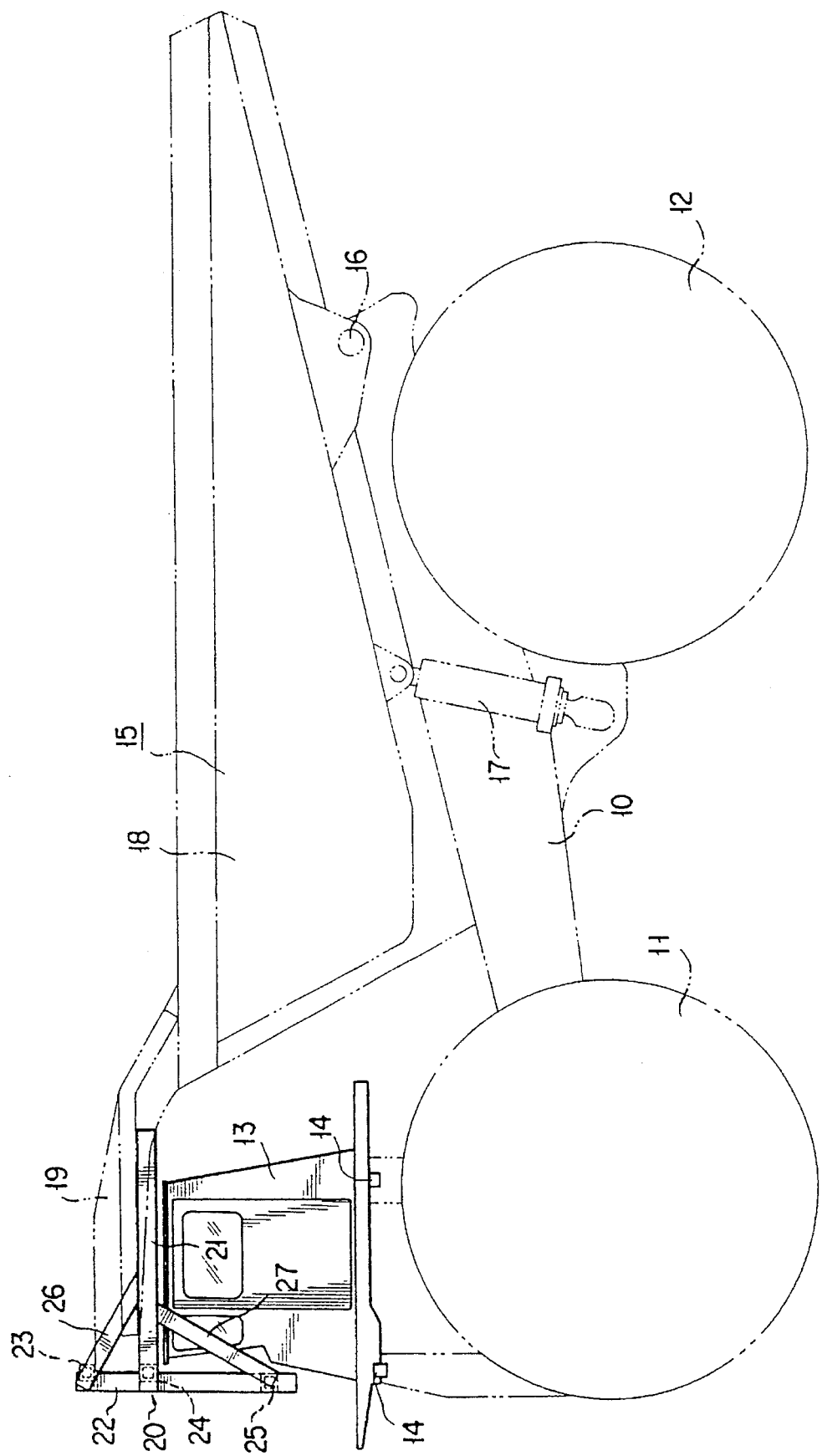
FIG. 5 is a side view of a large-size dump truck comprising a first example of a protective device for the front of an driver's cab according to the present invention.

As shown in FIG. 5, there is provided a truck body 10 to which front wheels 11 and rear wheels 12 are attached at its front and rear base portions, respectively. At the front of the truck body 10, a driver's cab 13 is fixed through an inserted buffer member 14 made of such as rubber. On the rear of the truck body 10, a vessel 15 is installed by a hinge 16 such that it can be lifted around the hinge 16, and a hoist cylinder 17 is inserted between the vessel 15 and the truck body 10.

The vessel 15 comprises a vessel body 18 for loading the earth and sand therein and a protector 19 protruding over the driver's cab 13. The protector 19 prevents the loaded earth and sand and so forth from falling down onto the driver's cab 13.

Figure 6:
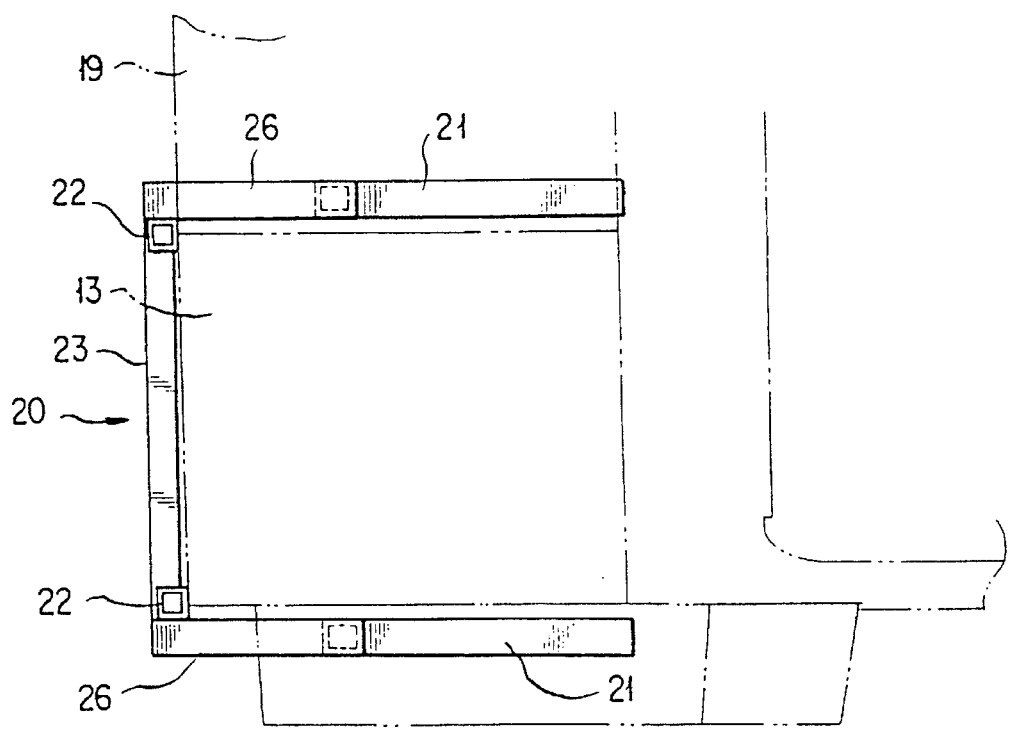
FIG. 6 is a plan view of the first embodiment.
Figure 7:
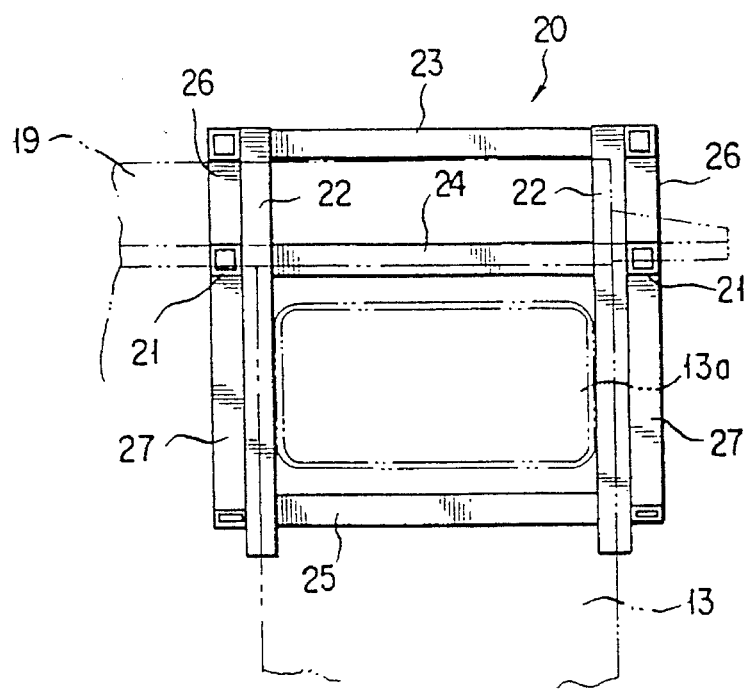
FIG. 7 is a front view of the first embodiment.

At the protector 19 of the vessel 15, a front protective guard 20 is installed in such a manner that the guard 20 extends forward through the outer sides of the driver's cab 13. The front protective guard 20, as shown in FIGS. 5 to 7, is composed of a pair of right and left horizontal attaching frames 21 and 21, a pair of right and left vertical protective frames 22 and 22, a plurality of horizontal protective frames consisting of an upper lateral protective frame 23, a middle lateral protective frame 24 and a lower lateral protective frame 25, and upper and lower stays 26, 26 and 27, 27. The horizontal attaching frames 21 and 21 are such that their base ends are fixed to the protector 19 and their tips extend forward through the outer sides of the operation room 13.

The vertical protective frames 22 and 22 are such that their middle portions are each fixed to the tips of a pair of the horizontal attaching frames 21 and 21 and they extend vertically, and the upper, middle, lower lateral protective frames 23 to 25 are each built between the pair of vertical protective frames 22 and 22, in front of the operation room 13. The upper and lower stays 26, 26 and 27, 27 are each obliquely attached between each of the vertical protective frames 22 and 22 and each of the horizontal attaching frames 21 and 21. The middle protective frame 24 and the lower lateral protective frame 25 are each positioned at upper and lower positions than a front glass 13a in front of the operation room 13.

Figure 8:
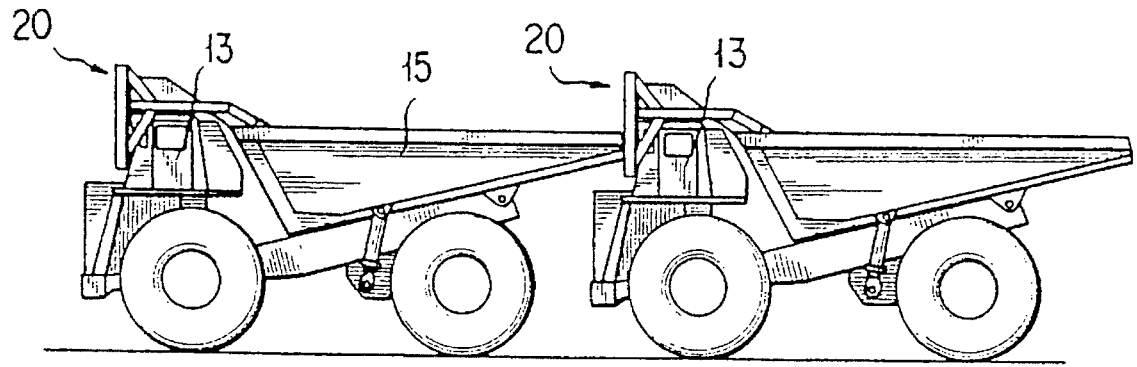
FIG. 8 is a side view explaining a collision between two large-size dump trucks shown in FIG. 5.

The present invention is constructed as described above. As a result, when a large-size dump truck travels backward and the rear of its vessel 15 collides with another large-size dump truck following after the preceding one as shown in FIG. 8, the rear of the vessel 15 collides with only the front protective guard 20 of the following dump truck, thus preventing its operation room 13 from being damaged.

Next, a second embodiment of the present invention will be described with reference to FIGS. 9 and 10.

Figure 9:
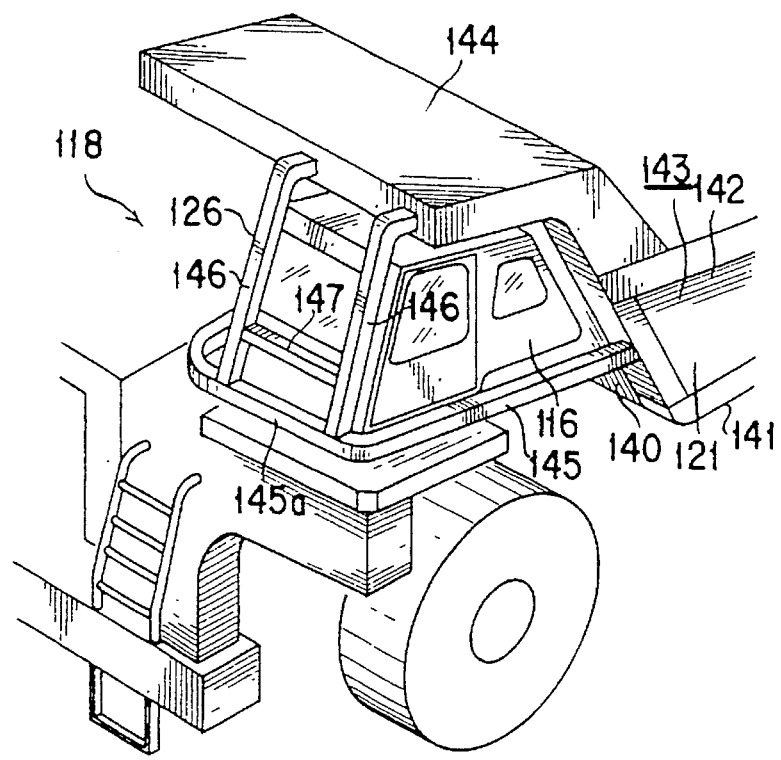
FIG. 9 is a perspective view showing the driver's cab and its surroundings of a large-size dump truck comprising a second embodiment of the protective device for the front of a driver's cab according to the present invention.
Figure 10:
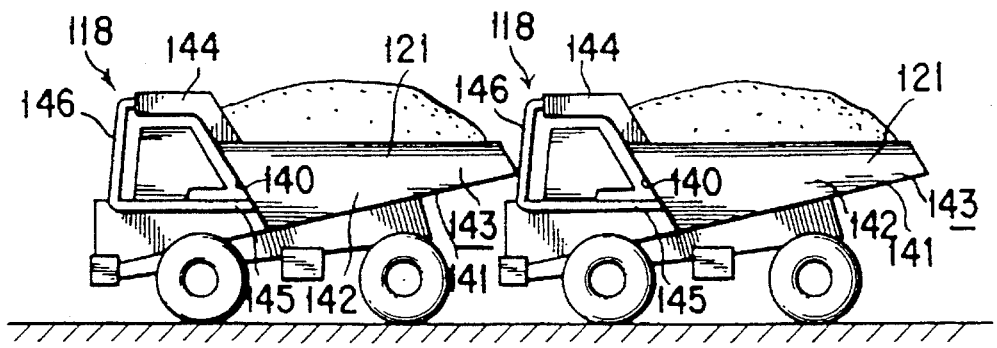
FIG. 10 is a side view explaining a collision between two large-size dump truck shown in FIG. 9.

A vessel 121 according to this embodiment, as shown in FIG. 9, comprises a main-body portion 143 composed of a front plate 140, a base plate 141 and both-side vertical plates 142 and 142, and a protector 144 attached as a unit body to the upper end of the front plate 140 and spread over the top of the operation room 116.

A horizontal protective frame 145 is fixed to the front plate 140 of the vessel 121 in a manner that the frame 145, shaped into almost a U-type as viewed vertically, surrounds the lower part of the operation room 116. Between the front part 145a of the U-shaped horizontal protective frame 145 and the front end of the protector 144, a pair of vertical protective frames 146 and 146 are bridged over from their lowermost ends to their uppermost ends, respectively. A lateral protective frame 147 is laterally bridged between the pair of vertical protective frames 146 and 146. All of these elements constitute an front protective guard 118.

In this way, the front protective guard 118 is fixed to both the front plate 140 of the vessel 121 and the protector 144, thereby being securely fastened to the vessel 121.

Further, a third embodiment of the present invention will be explained according to FIGS. 11 to 15.

Figure 11:
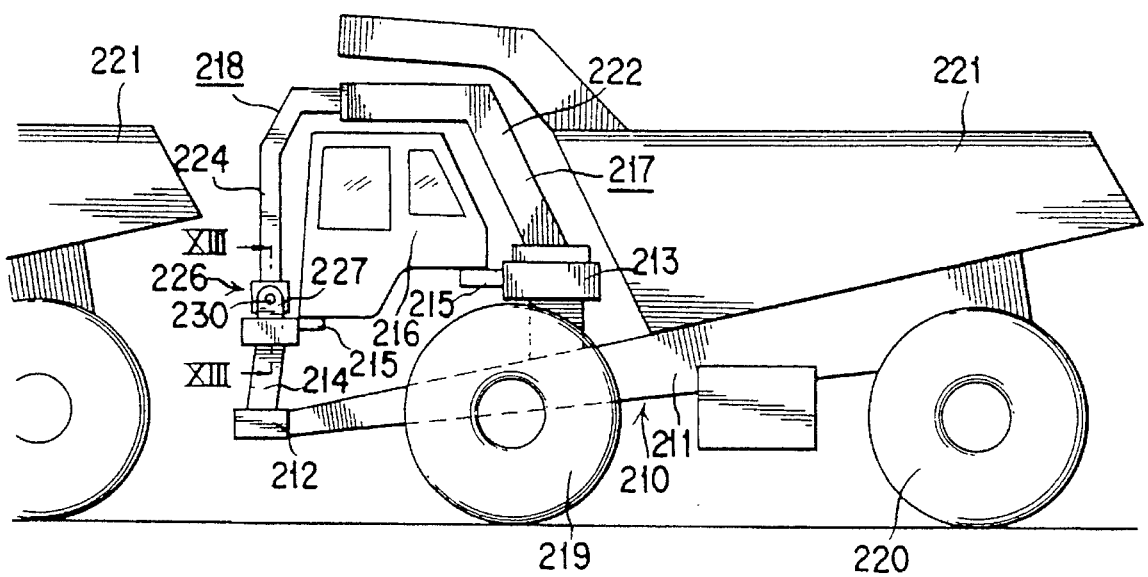
FIG. 11 is a side view of a large-size dump truck comprising a third embodiment of a protective device for the front of the driver's cab according to the present invention.

As shown in FIG. 11, provided is a truck body 210 that has front wheels 219 and rear wheels 220 at given positions nearer to the front and rear, respectively. A vessel 221 is installed, liftably from its front side, on the rear side of the back of the truck body 210, so that the rear of the vessel 221 protrudes backward from the position of the rear wheels 220. The truck body 210 is constructed in a manner that a pair of right and left main frames 211 and 211 are connected with each other by means of a front lateral frame 212, an arch-shaped frame 213 and a plurality of rear lateral frames (not shown), and a front vertical frame 214 is fixed to the front lateral frame 212.

The front vertical frame 214 and the arch-shaped frame 213 are fixed, through an elastic member 215, to the front and rear of a driver's cab 216, respectively. Furthermore, the arch-shaped frame 213 is fixed to the base portions of a protective guard 217 for falling and an front protective guard 218 is bridged between the front end of the protective guard 217 for falling and the front vertical frame 214.

Figure 12:
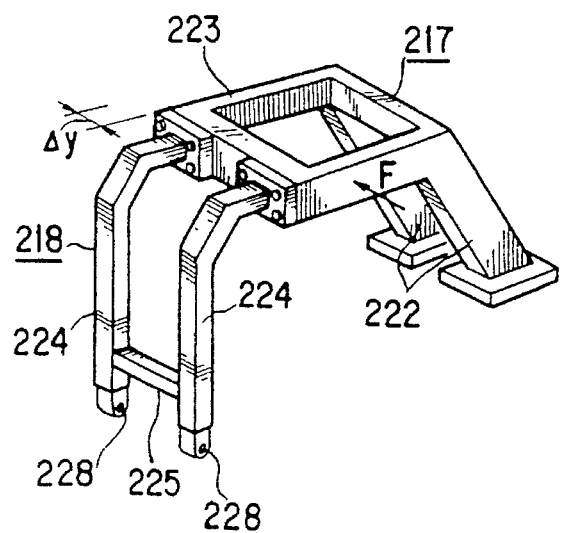
FIG. 12 is a perspective view showing a protective guard for the front of a driver's cab for falling and a protective guard for the front of a driver's cab embodied by the third embodiment.

The protective guard 217 for falling, as shown in FIG. 12, comprises a pair of rear struts 222 and 222 and an upper protective frame 223 shaped into a square and made as a unit body with the struts 222 and 222. The front protective guard 218 comprises a pair of vertical protective frames 224 and 224 fastened by bolts to the front surface of the upper protective frame 223 and a lateral protective frame 225 connecting the lower ends of the vertical protective frames 224 and 224. The bottoms of the pair of vertical protective frames 224 and 224, as shown in FIG. 11, are secured on the top of the front vertical frame 214 through a connection mechanism 226.

Figure 13:
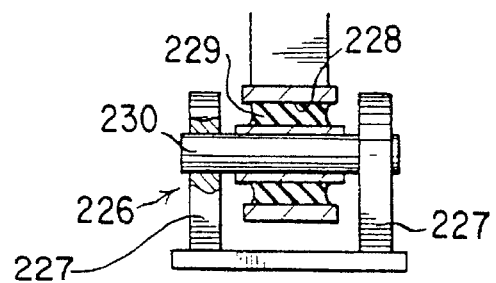
FIG. 13 is a sectional view taken along a XIII—XIII line in FIG. 11.

The connection mechanism 226, as shown in FIG. 13, has brackets 227 and 227 secured on the top of the front vertical frame 214 and has a construction using the brackets 227 and 227. An elastic tubular member 229 is forcibly inserted into bosses 228 and 228 formed on the bottoms of the vertical protective frames 224 and 224, and a pin 230 is forcibly inserted through one bracket 227, the elastic tubular member 229 and the other bracket 227, in turn.

Figure 14:
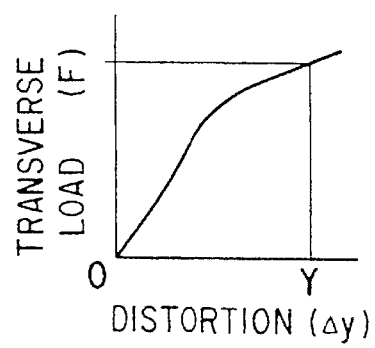
FIG. 14 is a chart showing a relation between transverse load given to the protective guard for falling shown in FIG. 11 and its distortion as yielded therein.

The protective guard 217 for falling is constructed such that, in the case of falling, collision energy can be absorbed by a deformation of $\Delta y$ accordingly to a transverse load F, as shown in a chart of FIG. 14. Correspondingly to it, the size of the connection mechanism 226 is designed to avoid interaction between the boss 228 and the brackets 227 and 227, when the upper portion of the vertical protective frame 224 is displaced by a distance corresponding to a maximum distortion Y when the protective guard 217 for falling absorbs a specified collision energy.

Since the present invention is constructed as mentioned above, the collision between the rear of the vessel 221 of a large-size dump truck and another large-size dump truck following after the preceding one creates only a collision to a pair of the protective frames 224 and 224. The protective frames 224 and 224 permit the driver's cab 216 to be protected and an operator in the driver's cab 216 is safe.

Figure 15:
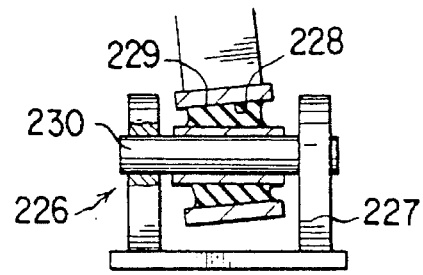
FIG. 15 is a functional explanation of a connection mechanism shown in FIG. 13 when receiving the transverse load.

Moreover, when a large-size dump truck falls down and a transverse load F shown by an arrow works onto the protective guard 217 for falling, the upper portion of the protective guard 217 for falling is distorted by $\Delta y$ to absorb collision energy. At the same time, although the upper portions of the vertical protective frames 224 and 224 are also distorted by $\Delta y$, the distortion of the vertical protective frames 224 and 224 is admitted thanks to the corresponding elastic-displacement of the elastic tubular member 229 as shown in FIG. 15.

Though the present invention has been explained with reference to the typical embodiments, it is obvious for one having ordinary skill in the art to make numerous modifications, omissions, and supplements without departing from the teachings and scope of the present invention in conjunction with the disclosed embodiments. The present invention therefore is not limited to the above embodiments and should be understood to include the scopes represented by the elements described in the appended claims and their equivalent scopes.

As mentioned hereinabove, the protective device for the front of a large-size dump truck according to the present invention is extremely effective as a protective device for the operation-room front of a large-size dump truck for operation such as construction work and ore transportation.

We claim:

1. A protective device for a driver's cab front of a large-size dump truck in which a driver's cab is secured on a front side of a truck body and a vessel is, liftably from a front side thereof, secured on a rear side of the truck body, and a first protective guard to protect an upper portion and a rear portion of the driver's cab is secured on an upper portion of the truck body between the driver's cab and the vessel, wherein a driver's cab front protective guard is arranged so as to extend between a front end portion of the first protective guard and a front end portion of the truck body in front of the driver's cab, and said driver's cab front protective guard comprising:

right and left vertical protective frames having upper portions attached to the front end portion of the first protective guard and having lower portions connected to the front end portion of the truck body; and a lateral protective frame bridged between the paired vertical protective frames;

wherein an elastic connection mechanism intervenes between each lower end of the pair of right and left vertical protective frames and the front end portion of the truck body.

2. A protective device for a driver's cab front according to claim 1, characterized in that the elastic connection mechanism comprises a bracket attached to the front end portion of the truck body, an elastic tubular member arranged to each lower end of the vertical protective frames, and a pin inserted through the bracket and the elastic tubular member.

3. A protective device for a driver's cab front of a large-size dump truck in which a driver's cab is secured on a front side of a truck body and a vessel is, liftably from a front side thereof, secured on a rear side of the truck body, and a first protective guard to protect an upper portion of a rear portion of the driver's cab is secured on an upper portion of the truck body between the driver's cab and the vessel, wherein a driver's cab front protective guard is arranged so as to extend between a front end portion of the first protective guard and a front end portion of the truck body in front of the driver's cab, and said driver's cab front protective guard comprising:

a pair of vertical protective frames having upper portions attached to the front end portion of the first protective guard and having lower portions connected to the front end portion of the truck body; and a lateral protective frame bridged between the paired vertical protective frames;

wherein the truck body comprises a main frame, a front lateral frame and front vertical frame attached to a front end of the main frame, and an arch-shaped frame attached to a middle portion of the main frame, wherein a base end portion of the first protective guard is attached to the arch-shaped frame, and a lower end portion of the driver's cab front protective guard is connected with the front vertical frame.

4. A protective device for a driver's cab front according to claim 3, characterized in that front and rear end portions of the driver's cab are each secured through an elastic member on the truck body.

5. A protective device for a driver's cab front of a large-size dump truck in which a driver's cab is secured on a front side of a truck body and a vessel is, liftably from the front side thereof, secured on a rear side of the truck body, wherein a driver's cab front protective guard protruding forward from a position of the driver's cab is attached on a front end portion of the vessel, and said driver's cab front protective guard comprising:

a pair of horizontal attaching frames having base portions attached to a protector extending over the driver's cab from a front panel of the vessel and having tips extending outward of the driver's cab;

a pair of vertical protective frames having middle portions each attached to the tips of the paired horizontal attaching frames and having entire bodies extending vertically;

a plurality of lateral protective frames bridged between the paired vertical protective frames in front of the driver's cab; and upper and lower stays obliquely bridged between the vertical protective frames and horizontal attaching frames.

6. A protective device for a driver's cab front of a large-size dump truck in which a driver's cab is secured on a front side of a truck body and a vessel is, liftably from a front side thereof, secured on a rear side of the truck body, wherein a driver's cab front protective guard is attached both to a front panel of the vessel and to a protector extended over the driver's cab from the front panel, and said driver's cab front protective guard comprising:

a pair of vertical protective frames having upper portions attached to a front end portion of the protector and having lower portions;

a lateral protective frame bridged between the paired vertical protective frames; and a horizontal protective frame formed into a U-shape as viewed from a position located vertically, whose base is attached to the front panel of the vessel and whose entire body surrounds the driver's cab, said pair of vertical protective frames comprising right and left vertical protective frames whose lower portions are attached to a front portion of the horizontal protective frame and whose upper portions are attached to the protector in front of the driver's cab.

* * * * *